US011553367B2

(12) United States Patent
Zhou et al.

(10) Patent No.: US 11,553,367 B2
(45) Date of Patent: Jan. 10, 2023

(54) MEASUREMENT METHOD, USER EQUIPMENT, AND NETWORK SIDE DEVICE

(71) Applicant: VIVO MOBILE COMMUNICATION CO., LTD., Dongguan (CN)

(72) Inventors: Jianping Zhou, Dongguan (CN); Xiaodong Yang, Dongguan (CN); Qian Zheng, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 19 days.

(21) Appl. No.: 17/134,464

(22) Filed: Dec. 27, 2020

(65) Prior Publication Data

US 2021/0120447 A1  Apr. 22, 2021

Related U.S. Application Data

(63) Continuation of application No. PCT/CN2019/093248, filed on Jun. 27, 2019.

(30) Foreign Application Priority Data

Jun. 27, 2018 (CN) .......................... 201810680359.6

(51) Int. Cl.
*H04W 24/10* (2009.01)
*H04B 17/336* (2015.01)
(Continued)

(52) U.S. Cl.
CPC .......... *H04W 24/10* (2013.01); *H04B 17/336* (2015.01); *H04W 48/16* (2013.01);
(Continued)

(58) Field of Classification Search
CPC ..... H04W 24/08; H04W 24/10; H04W 48/16; H04W 76/11; H04W 76/19; H04W 76/27;
(Continued)

(56) References Cited

U.S. PATENT DOCUMENTS

| 10,736,011 | B2* | 8/2020 | Nagasaka | ......... H04W 72/0413 |
| 10,856,131 | B2* | 12/2020 | Ryu | ...................... H04W 60/00 |
| 2018/0317275 | A1* | 11/2018 | Chang | .................. H04J 11/0089 |
| 2018/0368018 | A1* | 12/2018 | Kim | .................. H04W 72/1289 |

(Continued)

FOREIGN PATENT DOCUMENTS

| CN | 105792329 A | 7/2016 |
| CN | 106465171 A | 2/2017 |

(Continued)

OTHER PUBLICATIONS

International Search Report issued in corresponding International Application No. PCT/CN2019/093248, dated Aug. 29, 2019, 4 pages.

(Continued)

*Primary Examiner* — Jean A Gelin
(74) *Attorney, Agent, or Firm* — IPX PLLC

(57) ABSTRACT

The present disclosure provides a measurement method, user equipment, and a network side device. The method includes receiving first measurement configuration information sent by a network side device, and performing measurement in an inactive mode based on the first measurement configuration information, to obtain a measurement result, where the first measurement configuration information is used at least in the inactive mode.

18 Claims, 5 Drawing Sheets

(51) Int. Cl.
  *H04W 76/19* (2018.01)
  *H04W 76/11* (2018.01)
  *H04W 76/27* (2018.01)
  *H04W 48/16* (2009.01)
  *H04W 84/04* (2009.01)

(52) U.S. Cl.
  CPC ............ *H04W 76/11* (2018.02); *H04W 76/19* (2018.02); *H04W 76/27* (2018.02); *H04W 84/042* (2013.01)

(58) Field of Classification Search
  CPC .. H04W 76/32; H04W 84/042; H04B 17/327; H04B 17/336
  See application file for complete search history.

(56) References Cited

U.S. PATENT DOCUMENTS

| | | | |
|---|---|---|---|
| 2019/0037635 A1* | 1/2019 | Guo | H04W 76/27 |
| 2019/0387568 A1* | 12/2019 | Teyeb | H04W 72/042 |
| 2020/0022010 A1* | 1/2020 | Kim | H04W 16/14 |
| 2020/0022040 A1* | 1/2020 | Chen | H04W 76/27 |
| 2020/0029237 A1* | 1/2020 | Kim | H04W 68/02 |

FOREIGN PATENT DOCUMENTS

| | | |
|---|---|---|
| CN | 106535264 A | 3/2017 |
| CN | 106793169 A | 5/2017 |
| CN | 107770780 A | 3/2018 |
| WO | 2017005317 A1 | 1/2017 |

OTHER PUBLICATIONS

First Office Action issued in related Chinese Application No. 201810680359.6, dated May 7, 2020, 8 pages.

Ericsson, "Faster measurements and signaling for Ultra reliable mobility", 3GPP TSG RAN WG2 #97 Tdoc R2-1700921, Sep. 21, 2017, section 2, 3.

Ericsson, "Faster measurements and signaling for Ultra reliable mobility", 3GPP TSG-RAN WG2 NR Ad Hoc Tdoc R2-1700472, Jan. 19, 2017, section 2, 3.

Nokia et al., "Considerations on fast access inter-site small cells in NR", 3GPP TSG-RAN WG2 Meeting#96 R2-167545, Nov. 18, 2016, section 2, 3.

Search Report issued in related Chinese Application No. 201810680359.6, dated Jun. 14, 2020, 5 pages.

* cited by examiner

MEASUREMENT METHOD, USER EQUIPMENT, AND NETWORK SIDE DEVICE

CROSS REFERENCE TO RELATED APPLICATIONS

This application is a bypass continuation of PCT Application No. PCT/CN2019/093248 filed Jun. 27, 2019, which claims priority to Chinese Patent Application No. 201810680359.6, filed in China on Jun. 27, 2018, both of which are incorporated herein by reference in their entireties.

TECHNICAL FIELD

The present disclosure relates to the field of communications technologies, and in particular, to a measurement method, user equipment, and a network side device.

BACKGROUND

A carrier aggregation (Carrier Aggregation, CA) technology is introduced in a Long Term Evolution (Long Term Evolution, LTE) system. In the carrier aggregation technology, user equipment may be connected to a network side device for communication by using a plurality of cells, where one of the plurality of cells is a primary cell (Primary Cell, PCell), and another cell is a secondary cell (Secondary Cell, SCell). The secondary cell includes an active mode and an inactive mode, and the primary cell does not include an inactive mode and always maintains an active mode.

In a carrier aggregation technology in related technologies, the user equipment can only measure a cell in a connected mode. Consequently, there is a problem of relatively long activation time in the carrier aggregation technology in the related technologies.

SUMMARY

Embodiments of the present disclosure provide a measurement method, user equipment, and a network side device, to resolve a problem of relatively long activation time in a carrier aggregation technology in related technologies. According to a first aspect, an embodiment of the present disclosure provides a measurement method, where the method is applied to user equipment and includes: receiving first measurement configuration information sent by a network side device; and performing measurement in an inactive mode based on the first measurement configuration information, to obtain a measurement result; where the first measurement configuration information is used at least in the inactive mode.

According to a second aspect, an embodiment of the present disclosure provides a measurement method, where the method is applied to a network side device and includes: sending first measurement configuration information to user equipment, where the first measurement configuration information is used to enable the user equipment to perform measurement in an inactive mode based on the first measurement configuration information, to obtain a measurement result; where the first measurement configuration information is used at least in the inactive mode.

According to a third aspect, an embodiment of the present disclosure provides user equipment, including: a first receiving module, configured to receive first measurement configuration information sent by a network side device; and a first measurement module, configured to perform measurement in an inactive mode based on the first measurement configuration information, to obtain a measurement result; where the first measurement configuration information is used at least in the inactive mode.

According to a fourth aspect, an embodiment of the present disclosure provides a network side device, including: a first sending module, configured to send first measurement configuration information to user equipment, where the first measurement configuration information is used to enable the user equipment to perform measurement in an inactive mode based on the first measurement configuration information, to obtain a measurement result; where the first measurement configuration information is used at least in the inactive mode.

According to a fifth aspect, an embodiment of the present disclosure provides user equipment, including: a memory, a processor, and a computer program that is stored in the memory and that can run on the processor, where when the computer program is executed by the processor, steps in a measurement method corresponding to the user equipment provided in this embodiment of the present disclosure are implemented.

According to a sixth aspect, an embodiment of the present disclosure provides a network side device, including a memory, a processor, and a computer program that is stored in the memory and that can run on the processor, where when the computer program is executed by the processor, steps in a measurement method corresponding to the network side device provided in this embodiment of the present disclosure are implemented.

According to a seventh aspect, an embodiment of the present disclosure provides a computer-readable storage medium, where the computer-readable storage medium stores a computer program, and when the computer program is executed by a processor, steps of a measurement method corresponding to user equipment provided in this embodiment of the present disclosure or steps of a measurement method corresponding to a network side device are implemented.

In this way, in the embodiments of the present disclosure, the network side device sends measurement configuration information that is used at least in the inactive mode to the user equipment, so that the user equipment can perform measurement in the inactive mode based on the measurement configuration information. Because the user equipment can perform measurement in the inactive mode, the network side device can quickly configure an SCell of the user equipment and activate the SCell based on the measurement result in the inactive mode that is reported by the user equipment. It can be learned that the embodiments of the present disclosure help support enhanced rapid carrier activation and deactivation, so that an enhanced rapid carrier activation and deactivation technical solution can be improved.

BRIEF DESCRIPTION OF DRAWINGS

To describe the technical solutions in the embodiments of the present disclosure more clearly, the following briefly describes the accompanying drawings required in the embodiments of the present disclosure. Apparently, the accompanying drawings in the following descriptions show merely some embodiments of the present disclosure, and a person of ordinary skill in the art may still derive other drawings from these accompanying drawings without creative efforts.

DESCRIPTION OF EMBODIMENTS

The following clearly and completely describes the technical solutions in the embodiments of the present disclosure with reference to the accompanying drawings in the embodiments of the present disclosure. Apparently, the described embodiments are some but not all of the embodiments of the present disclosure. All other embodiments obtained by a person of ordinary skill in the art based on the embodiments of this disclosure without creative efforts shall fall within the protection scope of this disclosure.

The term "include" and any other variants in the specification and claims of this application are intended to cover a non-exclusive inclusion, for example, a process, method, system, product, or device that includes a list of steps or units is not necessarily limited to those expressly listed steps or units, but may include other steps or units not expressly listed or inherent to such a process, method, product, or device. In addition, "and/or" used in the specification and claims means at least one of the connected objects. For example, A and/or B represents the following three cases: Only A exists, only B exists, and both A and B exist.

In the embodiments of the present disclosure, the word such as "exemplary" or "example" is used to represent giving an example, an illustration, or a description. Any embodiment or design scheme described as "exemplary" or "for example" in the embodiments of this disclosure should not be construed as being more preferred or advantageous than other embodiments or design schemes. To be precise, the use of the term such as "exemplary" or "for example" is intended to present a related concept in a specific manner.

The following describes the embodiments of the present disclosure with reference to the accompanying drawings. A measurement method, user equipment, and a network side device provided in the embodiments of the present disclosure may be applied to a wireless communications system. The wireless communications system may be a 5G system, an evolved Long Term Evolution (Evolved Long Term Evolution, eLTE) system, or a subsequent evolved communications system.

Figure 1:
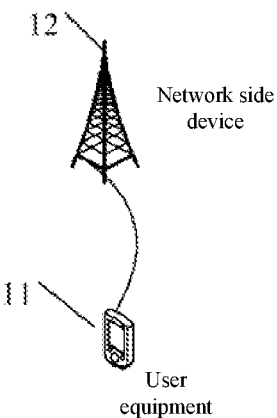
FIG. 1 is a structural diagram of a measurement control system according to an embodiment of the present disclosure.

FIG. 1 is a structural diagram of a measurement control system according to an embodiment of the present disclosure. As shown in FIG. 1, the measurement control system includes user equipment (User Equipment, UE) 11 and a network side device 12. The user equipment 11 may be a mobile communications terminal, for example, UE side devices such as a mobile phone, a tablet computer (Tablet Personal Computer), a laptop computer (Laptop Computer), a personal digital assistant (personal digital assistant, PDA), a mobile Internet device (Mobile Internet Device, MID), or a wearable device (Wearable Device). It should be noted that a specific type of the user equipment 11 is not limited in this embodiment of the present disclosure. The network side device 12 may be a 5G network side device (for example, a gNB or a 5G NR NB), or may be a 4G network side device (for example, an eNB), or may be a 3G network side device (for example, an NB), or a network side device in a subsequent evolved communications system. It should be noted that a specific type of the network side device 12 is not limited in this embodiment of the present disclosure.

In a 5G NR system, in addition to a connected mode and an idle mode, an independent radio resource control (Radio Resource Control, RRC) mode is also introduced, which is referred to as an inactive mode (inactive mode). Herein, the idle mode and the inactive mode may be referred to as non-connected modes.

In a related technology, a rapid activation and deactivation function is introduced to an enhanced carrier aggregation technology in an LTE enhancing carrier aggregation utilization (Enhancing CA Utilization, EuCA) project. The rapid activation and deactivation may refer to rapid carrier activation and deactivation that is applicable to an eLTE system, or may refer to rapid carrier activation and deactivation that is applicable to a 5G NR system, or may refer to rapid bandwidth part (Bandwidth Part, BWP) activation and deactivation that is applicable to a 5G NR system, or the like.

For rapid carrier activation and deactivation, the following method is provided in the related technology:

Based on an instruction of a network side device, the user equipment performs measurement in the non-connected mode, and immediately reports, after the user equipment enters the connected mode, that there is an available measurement result. When the network side device requests the user equipment to report a measurement result, the user equipment reports the measurement result. In this way, the network side device can quickly configure an SCell of the user equipment and activate the SCell based on the measurement result reported by the user equipment. Specific steps are as follows:

The network side device indicates measurement configuration information of the user equipment in the idle mode in a system broadcast message system information block type 5 (System Information Block Type 5, SIB5) and/or an RRC connection release message (RRC Connection Release). The network side device indicates, in a system broadcast message system information block type 2 (System Information Block Type 2, SIB2), that the network side device can receive the measurement result of the user equipment in the idle mode. When the user equipment determines that there is the measurement result in the idle mode, and the system broadcast message SIB2 indicates that the network side device can receive the measurement result of the user equipment in the idle mode, the user equipment reports, to the network side device and in RRC connection setup complete (RRC Connection Setup Complete) or RRC connection resume complete (RRC Connection Resume Complete) in the Msg5, that there is an available idle mode measurement result indication. The network side device adds an idle mode measurement result request (idle Mode Measurement Req) to a UE information request (UE Information Request) message to request an idle mode measurement result from the UE. After receiving the idle Mode Measurement Req carried in the UE Information Request, the user equipment adds an idle mode measurement result (meas Results idle) to a UE information response (UE Information Response) message, to report the measurement result to a base station. The network side device quickly configures and activates the SCell of the user equipment based on the idle mode measurement result reported by the user equipment.

Figure 2:
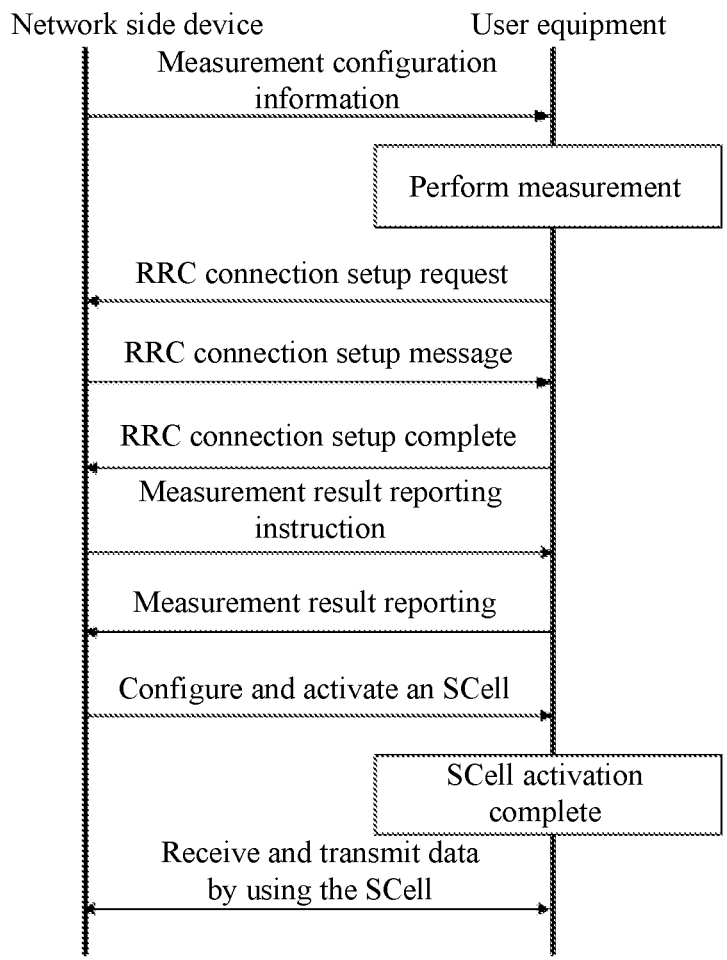
FIG. 2 is a flowchart of rapid carrier activation and deactivation.

For the foregoing process, refer to FIG. 2.

In a related technology, the network side device indicates only the measurement configuration information of the user equipment in the idle mode. As described above, the network side device indicates the measurement configuration information of the user equipment in the idle mode in the system broadcast message and/or the RRC connection release message. However, for another RRC non-connected mode, that is, the inactive mode, a carrier aggregation enhancement technology has a problem of relatively long activation time due to a lack of a corresponding measurement configuration solution.

Based on this, the embodiments of the present disclosure aim to provide a measurement control system shown in FIG. 1, and provide a measurement method applied to the measurement control system. The method is as follows:

receiving first measurement configuration information sent by a network side device; and performing measurement in an inactive mode based on the first measurement configuration information, to obtain a measurement result; where the first measurement configuration information is used at least in the inactive mode.

In this way, in this embodiment of the present disclosure, the network side device sends measurement configuration information that is used at least in the inactive mode to user equipment, so that the user equipment can perform measurement in the inactive mode based on the measurement configuration information. Because the user equipment can perform measurement in the inactive mode, the network side device can quickly configure an SCell of the user equipment and activate the SCell based on the measurement result in the inactive mode that is reported by the user equipment. It can be learned that this embodiment of the present disclosure helps support enhanced rapid carrier activation and deactivation, so that an enhanced rapid carrier activation and deactivation technical solution can be improved.

In addition, in a case in which the network side device indicates, for example in a system broadcast message and/or an RRC connection release message, the measurement configuration information of the user equipment in the inactive mode, when the user equipment enters an idle mode from the inactive mode, whether the measurement configuration information configured for the inactive mode is applicable to measurement performed by the user equipment in the idle mode is also a problem that needs to be resolved in the embodiments of the present disclosure.

To resolve the foregoing problem, the embodiments of the present disclosure are specifically described by using a measurement configuration solution of the user equipment in the non-connected mode that is indicated by the network side device and a related measurement behavior of the user equipment in the non-connected mode.

Figure 3:
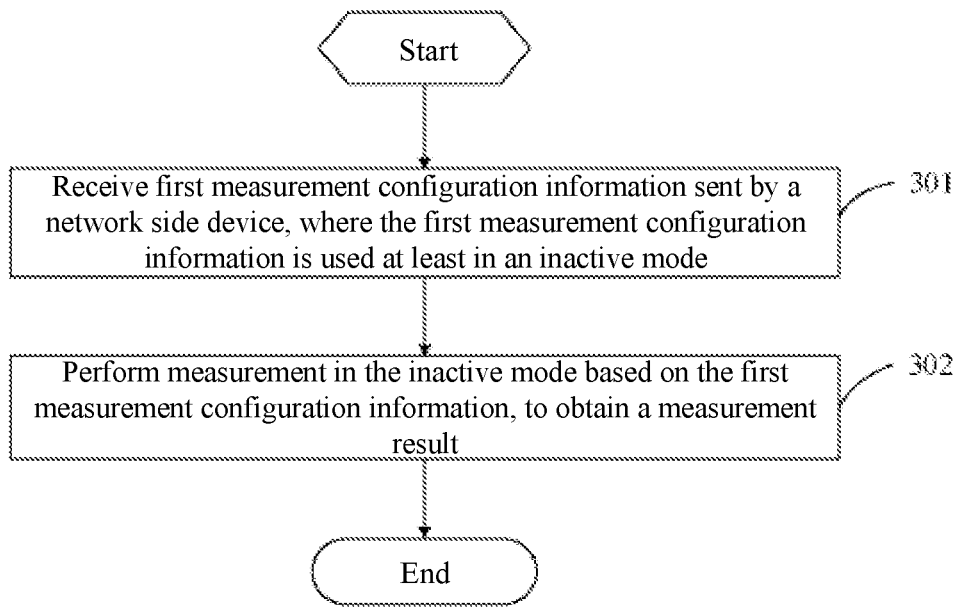
FIG. 3 is a flowchart of a measurement method according to an embodiment of the present disclosure.

FIG. 3 is a flowchart of a measurement method according to an embodiment of the present disclosure.

The measurement method in this embodiment of the present disclosure is applied to user equipment. In this embodiment of the present disclosure, the user equipment may be understood as user equipment that has a measurement capability in a non-connected mode. A 5G NR system is used as an example. The non-connected mode of the user equipment may be an idle mode, or may be an inactive mode. In other words, the user equipment is user equipment that has an idle mode and/or inactive mode measurement capability.

As shown in FIG. 3, the measurement method includes the following steps.

Step 301: Receive first measurement configuration information sent by a network side device, where the first measurement configuration information is used at least in an inactive mode.

In this step, the first measurement configuration information may be included in a system broadcast message SIB5 and/or a radio resource control RRC connection release message, or the network side device may configure the first measurement configuration information in a system broadcast message SIB5 and/or an RRC connection release message.

The first measurement configuration information is used at least in the inactive mode, and may include a plurality of different implementations. For example, the first measurement configuration information may be used only in the inactive mode; or the first measurement configuration information may be further used in another non-connected mode such as an idle mode in addition to the inactive mode.

The first measurement configuration information may include at least one of the following items:

measurement duration;

a measurement frequency;

a measurement bandwidth (Bandwidth) or bandwidth part (Bandwidth part);

a valid measurement area, for example, a cell identity (ID) list, a physical cell ID (Physical Cell Identity, PCI) list, a subset or a full set of a radio access network notification area (Ran Notification Area, RNA) ID list, or a subset or a full set of a core network tracking area (Tracking Area, TA) ID list;

a target measurement area, for example, a cell ID list, a PCI list, a subset or a full set of an RNA ID list, or a subset or a full set of a TA ID list;

a measurement type, for example, any one or a combination of reference signal receiving power (Reference Signal Receiving Power, RSRP), reference signal receiving quality (Reference Signal Receiving Quality, RSRQ), and a signal to interference plus noise ratio (Signal to Interference plus Noise Ratio, SINR); and a measurement reporting threshold, for example, any one or a combination of an RSRP threshold, an RSRQ threshold, and an SINR threshold.

Step 302: Perform measurement in the inactive mode based on the first measurement configuration information, to obtain a measurement result.

In this step, the user equipment can perform measurement in the inactive mode based on the first measurement configuration information sent by the network side device, and may obtain the measurement result in the inactive mode. The user equipment can perform measurement at least in the inactive mode, which helps support enhanced rapid carrier activation and deactivation, thereby improving an enhanced rapid carrier activation and deactivation technical solution.

The measurement result measured by the user equipment in the inactive mode may include any one or a combination of the following items:

a measurement identifier (meas Id), a measurement frequency, RSRP, RSRQ, a physical cell identity (Physical Cell identity, PCI), a cell global identity (Cell Global Identifier, CGI), a tracking area code (Tracking Area Code, TAC), and a public land mobile network identifier list (Public Land Mobile Network Idlist, PLMN Idlist).

Optionally, the first measurement configuration information is further used in an idle mode.

The method further includes:

performing measurement in the idle mode based on the first measurement configuration information.

In this optional implementation, the network side device may configure, in the system broadcast message SIB5 and/or the RRC connection release message, measurement configuration information that is applicable to two non-connected modes: the idle mode and the inactive mode. In other words, the first measurement configuration information is applicable to both the inactive mode and the idle mode.

In this way, in both the inactive mode or the idle mode, the user equipment can perform measurement based on the first measurement configuration information, and may separately obtain measurement results in the idle mode and the inactive mode. The user equipment can perform measurement in both the inactive mode and the idle mode based on the first measurement configuration information, so that the network side device can quickly configure an SCell of the user equipment and activate the SCell based on the measurement result in the inactive mode or the idle mode that is reported by the user equipment. It can be learned that this embodiment of the present disclosure helps support enhanced rapid carrier activation and deactivation, so that an enhanced rapid carrier activation and deactivation technical solution can be improved.

The first measurement configuration information may include at least one of the following items:

measurement duration;

a measurement frequency;

a measurement bandwidth or bandwidth part;

a valid measurement area, for example, a cell ID list, a PCI list, a subset or a full set of an RNA ID list, or a subset or a full set of a TA ID list;

a target measurement area, for example, a cell ID list, a PCI list, a subset or a full set of an RNA ID list, or a subset or a full set of a TA ID list;

a measurement type, for example, any one or a combination of RSRP, RSRQ, and an SINR; and a measurement reporting threshold, for example, any one or a combination of an RSRP threshold, an RSRQ threshold, and an SINR threshold.

The measurement result measured by the user equipment in the inactive mode may include any one or a combination of the following items:

a meas Id, a measurement frequency, RSRP, RSRQ, a PCI, a CGI, a TAC, and a PLMN Idlist.

Optionally, the first measurement configuration information is used in the inactive mode.

The method further includes:

receiving second measurement configuration information sent by the network side device; and performing measurement in an idle mode based on the second measurement configuration information; where the second measurement configuration information is used in the idle mode.

In this optional implementation, the network side device may configure, in the system broadcast message SIB5 and/or the RRC connection release message, respective measurement configuration information for the idle mode and the inactive mode. In other words, the first measurement configuration information is only applicable to the inactive mode, and the second measurement configuration information is only applicable to the idle mode.

In this way, when the user equipment is in the inactive mode, the user equipment needs to perform measurement based on the first measurement configuration information. When the user equipment is in the idle mode, the user equipment needs to perform measurement based on the second measurement configuration information. The user equipment may separately perform measurement in the inactive mode and the idle mode based on respective measurement configuration information, so that the network side device can quickly configure an SCell of the user equipment and activate the SCell based on the measurement result in the inactive mode or the idle mode that is reported by the user equipment. It can be learned that this embodiment of the present disclosure helps support enhanced rapid carrier activation and deactivation, so that an enhanced rapid carrier activation and deactivation technical solution can be improved.

The first measurement configuration information may include at least one of the following items:

measurement duration;

a measurement frequency;

a measurement bandwidth or bandwidth part;

a valid measurement area, for example, a cell ID list, a PCI list, a subset or a full set of an RNA ID list, or a subset or a full set of a TA ID list;

a target measurement area, for example, a cell ID list, a PCI list, a subset or a full set of an RNA ID list, or a subset or a full set of a TA ID list;

a measurement type, for example, any one or a combination of RSRP, RSRQ, and an SINR; and a measurement reporting threshold, for example, any one or a combination of an RSRP threshold, an RSRQ threshold, and an SINR threshold.

Correspondingly, the second measurement configuration information may include at least one of the following items:

measurement duration;

a measurement frequency;

a measurement bandwidth or bandwidth part;

a valid measurement area, for example, a cell ID list, a PCI list, a subset or a full set of an RNA ID list, or a subset or a full set of a TA ID list;

a target measurement area, for example, a cell ID list, a PCI list, a subset or a full set of an RNA ID list, or a subset or a full set of a TA ID list;

a measurement type, for example, any one or a combination of RSRP, RSRQ, and an SINR; and a measurement reporting threshold, for example, any one or a combination of an RSRP threshold, an RSRQ threshold, and an SINR threshold.

The measurement result measured by the user equipment in the inactive mode may include any one or a combination of the following items:

a meas Id, a measurement frequency, RSRP, RSRQ, a PCI, a CGI, a TAC, and a PLMN Idlist.

Optionally, the first measurement configuration information is used in the inactive mode.

The method further includes:

if the user equipment switches from the inactive mode to the idle mode and a measurement timer does not expire, performing the following processing on the first measurement configuration information:

clearing access stratum context information stored in the user equipment, where the access stratum context information includes the first measurement configuration information and the measurement result; or clearing the first measurement configuration information and the measurement result; or clearing the first measurement configuration information but retaining the measurement result; or clearing the measurement result but retaining the first measurement configuration information; or retaining the first measurement configuration information and the measurement result.

In this optional implementation, the network side device configures measurement configuration information only for the inactive mode in the system broadcast message SIB5 and/or the RRC connection release message.

Because the network side device does not configure measurement configuration information for the idle mode, when the user equipment switches from the inactive mode to the idle mode, the user equipment can perform any one of the following processing on the first measurement configuration information:

The user equipment clears stored access stratum context (Access Stratum Context, AS context) information. For example, the user equipment may store the access stratum context information after receiving the RRC connection release message or an RRC connection suspend message. The access stratum context information includes the measurement configuration information (that is, the first measurement configuration information) in the inactive mode and the measurement result in the inactive mode. A processing manner of the user equipment may be understood as follows: Neither the measurement configuration information in the inactive mode nor the measurement result measured in the inactive mode is applicable to the user equipment in the idle mode.

Alternatively, the user equipment clears the measurement configuration information in the inactive mode and the measurement result measured in the inactive mode. Similarly, a processing manner of the user equipment may be understood as follows: Neither the measurement configuration information in the inactive mode nor the measurement result measured in the inactive mode is applicable to the user equipment in the idle mode.

Alternatively, the user equipment clears the measurement configuration information in the inactive mode, but does not clear the measurement result in the inactive mode. A processing manner of the user equipment may be understood as follows: The measurement configuration information in the inactive mode is not applicable to the user equipment in the idle mode, but the measurement result measured in the inactive mode may be used by the user equipment in the idle mode.

Alternatively, the user equipment clears the measurement result measured in the inactive mode, but does not clear the measurement configuration information in the inactive mode. A processing manner of the user equipment may be understood as follows: The measurement result measured in the inactive mode is not applicable to the user equipment in the idle mode, but the measurement configuration information in the inactive mode may be used by the user equipment in the idle mode.

Alternatively, the user equipment does not clear the measurement configuration information in the inactive mode or the measurement result measured in the inactive mode. A processing manner of the user equipment may be understood as follows: Both the measurement configuration information in the inactive mode and the measurement result measured in the inactive mode are applicable to the user equipment in the idle mode.

It should be noted that when the user equipment switches from the inactive mode to the idle mode and the measurement timer expires, the user equipment automatically clears the measurement configuration information in the inactive mode and the measurement result measured in the inactive mode.

In this implementation, when any one of the following conditions is met, it may be considered that the user equipment switches from the inactive mode to the idle mode.

When the user equipment moves beyond network coverage, it may be considered that the user equipment switches from the inactive mode to the idle mode. Alternatively, when the user equipment initiates an RRC connection resume request but RRC connection resume fails, it may be considered that the user equipment switches from the inactive mode to the idle mode.

In this embodiment of the present disclosure, the network side device sends measurement configuration information that is used at least in the inactive mode to the user equipment, so that the user equipment can perform measurement in the inactive mode based on the measurement configuration information. Because the user equipment can perform measurement in the inactive mode, the network side device can quickly configure an SCell of the user equipment and activate the SCell based on the measurement result in the inactive mode that is reported by the user equipment. It can be learned that this embodiment of the present disclosure helps support enhanced rapid carrier activation and deactivation, so that an enhanced rapid carrier activation and deactivation technical solution can be improved.

Figure 4:
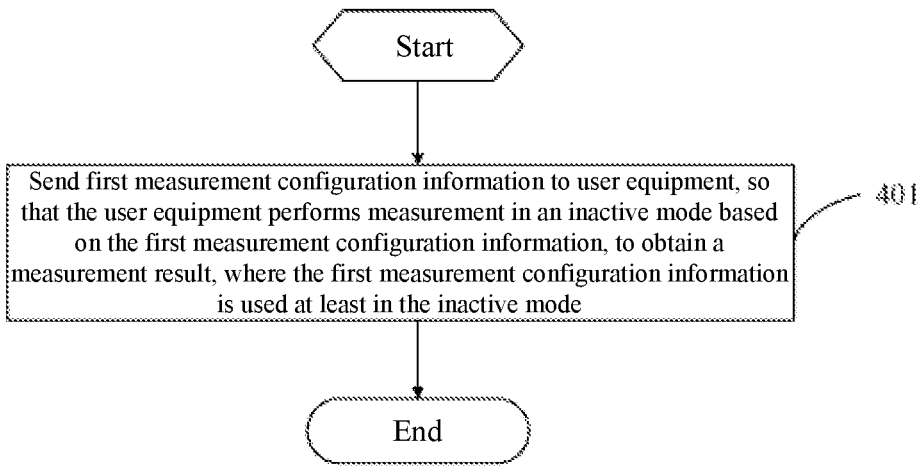
FIG. 4 is a flowchart of another measurement method according to an embodiment of the present disclosure.

FIG. 4 is a flowchart of another measurement method according to an embodiment of the present disclosure. As shown in FIG. 4, the measurement method is applied to a network side device and includes the following steps:

Step 401: Send first measurement configuration information to user equipment, so that the user equipment performs measurement in an inactive mode based on the first measurement configuration information, to obtain a measurement result, where the first measurement configuration information is used at least in the inactive mode.

Optionally, the first measurement configuration information is further used in an idle mode, so that the user equipment performs measurement in the idle mode based on the first measurement configuration information.

Optionally, the first measurement configuration information is used in the inactive mode.

The method further includes:

sending second measurement configuration information to the user equipment, so that the user equipment performs measurement in an idle mode based on the second measurement configuration information; where the second measurement configuration information is used in the idle mode.

Optionally, the first measurement configuration information includes at least one of the following items:

a measurement bandwidth or bandwidth part, measurement duration, a measurement frequency, a valid measurement area, a target measurement area, a measurement type, and a measurement reporting threshold.

Optionally, the valid measurement area includes at least one of the following items:

a cell identity list, a physical cell identity PCI list, a subset or a full set of a radio access network notification area RNA identity list, and a subset or a full set of a core network tracking area TA identity list; or the target measurement area includes at least one of the following items:

a cell identity list, a PCI list, a subset or a full set of an RNA identity list, and a subset or a full set of a TA identity list; or the measurement type includes at least one of the following items:

reference signal receiving power RSRP, reference signal receiving quality RSRQ, and a signal to interference plus noise ratio SINR; or the measurement reporting threshold includes at least one of the following items:

an RSRP threshold, an RSRQ threshold, and an SINR threshold.

Optionally, the measurement result includes at least one of the following items:

a measurement identifier, a measurement frequency, RSRP, RSRQ, a physical cell identity PCI, a cell global identity CGI, a tracking area code TAC, and a public land mobile network identifier list PLMN Idlist.

Optionally, the first measurement configuration information is included in a system broadcast message SIB5 and/or a radio resource control RRC connection release message.

It should be noted that this embodiment of the present disclosure is used as an embodiment of a network side device corresponding to the embodiment shown in FIG. 3. For specific implementations of this embodiment, refer to related descriptions of the embodiment shown in FIG. 3. The same beneficial effects can be achieved. To avoid repetition, details are not described herein again.

Figure 5:
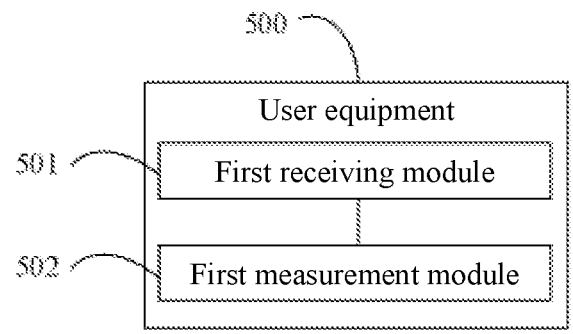
FIG. 5 is a structural diagram of user equipment according to an embodiment of the present disclosure.

FIG. 5 is a structural diagram of user equipment according to an embodiment of the present disclosure. As shown in FIG. 5, user equipment 500 includes:

a first receiving module 501, configured to receive first measurement configuration information sent by a network side device; and a first measurement module 502, configured to perform measurement in an inactive mode based on the first measurement configuration information, to obtain a measurement result; where the first measurement configuration information is used at least in the inactive mode.

Optionally, the first measurement configuration information is further used in an idle mode.

Figure 6:
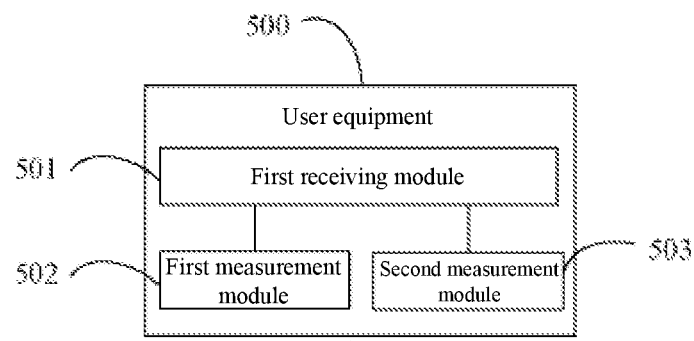
FIG. 6 is a structural diagram of another user equipment according to an embodiment of the present disclosure.

As shown in FIG. 6, the user equipment 500 further includes:

a second measurement module 503, configured to perform measurement in the idle mode based on the first measurement configuration information.

Optionally, the first measurement configuration information is used in the inactive mode.

Figure 7:
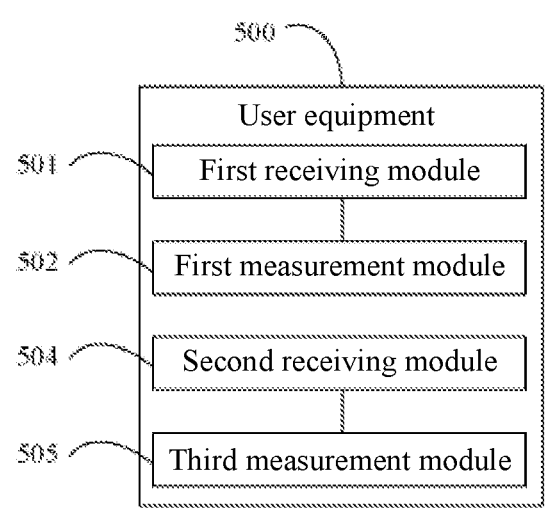
FIG. 7 is a structural diagram of another user equipment according to an embodiment of the present disclosure.

As shown in FIG. 7, the user equipment 500 further includes:

a second receiving module 504, configured to receive second measurement configuration information sent by a network side device; and a third measurement module 505, configured to perform measurement in the idle mode based on the second measurement configuration information; where the second measurement configuration information is used in the idle mode.

Optionally, the first measurement configuration information is used in the inactive mode.

Figure 8:
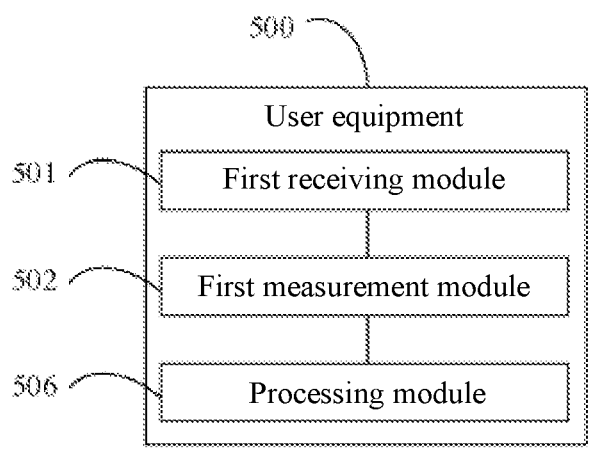
FIG. 8 is a structural diagram of another user equipment according to an embodiment of the present disclosure.

As shown in FIG. 8, the user equipment 500 further includes:

a processing module 506, configured to: if the user equipment switches from the inactive mode to the idle mode and a measurement timer does not expire, perform the following processing on the first measurement configuration information:

clearing access stratum context information stored in the user equipment, where the access stratum context information includes the first measurement configuration information and the measurement result; or clearing the first measurement configuration information and the measurement result; or clearing the first measurement configuration information but retaining the measurement result; or clearing the measurement result but retaining the first measurement configuration information; or retaining the first measurement configuration information and the measurement result.

Optionally, if the user equipment moves beyond network coverage, the user equipment switches from the inactive mode to the idle mode; or if the user equipment initiates an RRC connection resume request and RRC connection resume fails, the user equipment switches from the inactive mode to the idle mode.

Optionally, the first measurement configuration information includes at least one of the following items:

a measurement bandwidth or bandwidth part, measurement duration, a measurement frequency, a valid measurement area, a target measurement area, a measurement type, and a measurement reporting threshold.

Optionally, the valid measurement area includes at least one of the following items:

a cell identity list, a physical cell identity PCI list, a subset or a full set of a radio access network notification area RNA identity list, and a subset or a full set of a core network tracking area TA identity list; or the target measurement area includes at least one of the following items:

a cell identity list, a PCI list, a subset or a full set of an RNA identity list, and a subset or a full set of a TA identity list; or the measurement type includes at least one of the following items:

reference signal receiving power RSRP, reference signal receiving quality RSRQ, and a signal to interference plus noise ratio SINR; or the measurement reporting threshold includes at least one of the following items:

an RSRP threshold, an RSRQ threshold, and an SINR threshold.

Optionally, the measurement result includes at least one of the following items:

a measurement identifier, a measurement frequency, RSRP, RSRQ, a physical cell identity PCI, a cell global identity CGI, a tracking area code TAC, and a public land mobile network identifier list PLMN Idlist.

Optionally, the first measurement configuration information is included in a system broadcast message SIB5 and/or a radio resource control RRC connection release message.

It should be noted that the user equipment 500 in this embodiment of the present disclosure may be user equipment in any implementation in the method embodiments. Any implementation of the user equipment in the method embodiments may be implemented by the user equipment 500 in this embodiment of the present disclosure, and a same beneficial effect is achieved. To avoid repetition, details are not described herein again.

Figure 9:
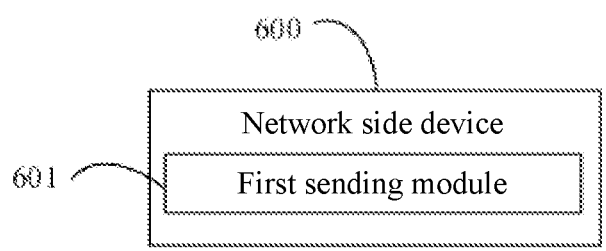
FIG. 9 is a structural diagram of a network side device according to an embodiment of the present disclosure.

FIG. 9 is a structural diagram of a network side device according to an embodiment of the present disclosure. As shown in FIG. 9, a network side device 600 includes:

a first sending module 601, configured to send first measurement configuration information to user equipment, so that the user equipment performs measurement in an inactive mode based on the first measurement configuration information, to obtain a measurement result; where the first measurement configuration information is used at least in the inactive mode.

Optionally, the first measurement configuration information is further used in an idle mode, so that the user equipment performs measurement in the idle mode based on the first measurement configuration information.

Optionally, the first measurement configuration information is used in the inactive mode.

Figure 10:
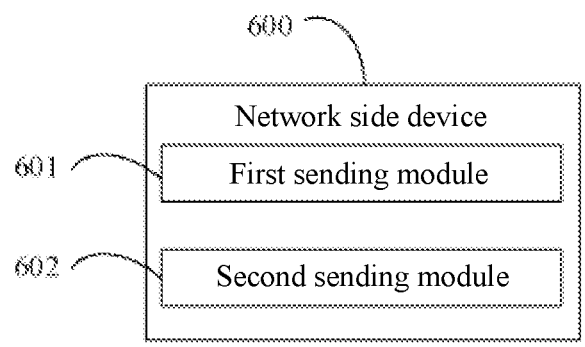
FIG. 10 is a structural diagram of another network side device according to an embodiment of the present disclosure.

As shown in FIG. 10, the network side device 600 further includes:

a second sending module 602, configured to send second measurement configuration information to the user equipment, so that the user equipment performs measurement in an idle mode based on the second measurement configuration information; where the second measurement configuration information is used in the idle mode.

Optionally, the first measurement configuration information includes at least one of the following items:

a measurement bandwidth or bandwidth part, measurement duration, a measurement frequency, a valid measurement area, a target measurement area, a measurement type, and a measurement reporting threshold.

Optionally, the valid measurement area includes at least one of the following items:

a cell identity list, a physical cell identity PCI list, a subset or a full set of a radio access network notification area RNA identity list, and a subset or a full set of a core network tracking area TA identity list; or the target measurement area includes at least one of the following items:

a cell identity list, a PCI list, a subset or a full set of an RNA identity list, and a subset or a full set of a TA identity list; or the measurement type includes at least one of the following items:

reference signal receiving power RSRP, reference signal receiving quality RSRQ, and a signal to interference plus noise ratio SINR; or the measurement reporting threshold includes at least one of the following items:

an RSRP threshold, an RSRQ threshold, and an SINR threshold.

Optionally, the measurement result includes at least one of the following items:

a measurement identifier, a measurement frequency, RSRP, RSRQ, a physical cell identity PCI, a cell global identity CGI, a tracking area code TAC, and a public land mobile network identifier list PLMN Idlist.

Optionally, the first measurement configuration information is included in a system broadcast message SIB5 and/or a radio resource control RRC connection release message.

It should be noted that the foregoing network side device 600 in this embodiment of the present disclosure may be a network side device of any implementation in the method embodiment, any implementation of the network side device in the method embodiment can be implemented by the foregoing network side device 600 in this embodiment of the present disclosure, and the same beneficial effects can be achieved. To avoid repetition, details are not described herein again.

Figure 11:
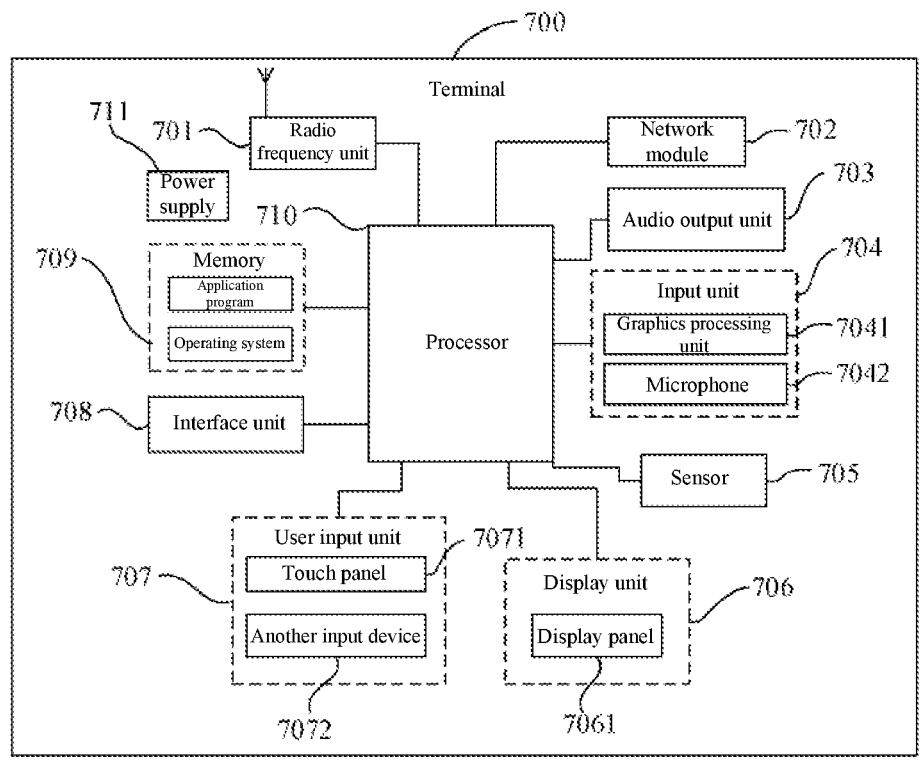
FIG. 11 is a schematic diagram of a hardware structure of user equipment according to an embodiment of the present disclosure.

FIG. 11 is a schematic diagram of a hardware structure of user equipment for implementing the embodiments of the present disclosure. User equipment 700 includes but is not limited to components such as a radio frequency unit 701, a network module 702, an audio output unit 703, an input unit 704, a sensor 705, a display unit 706, a user input unit 707, an interface unit 708, a memory 709, a processor 710, and a power supply 711. A person skilled in the art may understand that a structure of the UE shown in FIG. 11 does not constitute a limitation on the UE, and the user equipment may include more or fewer components than those shown in the figure, or combine some components, or have different component arrangements. In this embodiment of the present disclosure, the user equipment includes but is not limited to a mobile phone, a tablet computer, a laptop computer, a palmtop computer, an in-vehicle user equipment, a wearable device, a pedometer, and the like.

The processor 710 is configured to:

receive first measurement configuration information sent by a network side device; and perform measurement in an inactive mode based on the first measurement configuration information, to obtain a measurement result; where the first measurement configuration information is used at least in the inactive mode.

Optionally, the first measurement configuration information is further used in an idle mode.

The processor 710 is further configured to:

perform measurement in the idle mode based on the first measurement configuration information.

Optionally, the first measurement configuration information is used in the inactive mode.

The processor 710 is further configured to:

receive second measurement configuration information sent by the network side device; and perform measurement in an idle mode based on the second measurement configuration information; where the second measurement configuration information is used in the idle mode.

Optionally, the first measurement configuration information is used in the inactive mode.

The processor 710 is further configured to:

if the user equipment switches from the inactive mode to the idle mode and a measurement timer does not expire, perform the following processing on the first measurement configuration information:

clearing access stratum context information stored in the user equipment, where the access stratum context information includes the first measurement configuration information and the measurement result; or clearing the first measurement configuration information and the measurement result; or clearing the first measurement configuration information but retaining the measurement result; or clearing the measurement result but retaining the first measurement configuration information; or retaining the first measurement configuration information and the measurement result.

Optionally, if the user equipment moves beyond network coverage, the user equipment switches from the inactive mode to the idle mode; or if the user equipment initiates an RRC connection resume request and RRC connection resume fails, the user equipment switches from the inactive mode to the idle mode.

Optionally, the first measurement configuration information includes at least one of the following items:

a measurement bandwidth or bandwidth part, measurement duration, a measurement frequency, a valid measurement area, a target measurement area, a measurement type, and a measurement reporting threshold.

Optionally, the valid measurement area includes at least one of the following items:

a cell identity list, a physical cell identity PCI list, a subset or a full set of a radio access network notification area RNA identity list, and a subset or a full set of a core network tracking area TA identity list; or the target measurement area includes at least one of the following items:

a cell identity list, a PCI list, a subset or a full set of an RNA identity list, and a subset or a full set of a TA identity list; or the measurement type includes at least one of the following items:

reference signal receiving power RSRP, reference signal receiving quality RSRQ, and a signal to interference plus noise ratio SINR; or the measurement reporting threshold includes at least one of the following items:

an RSRP threshold, an RSRQ threshold, and an SINR threshold.

Optionally, the measurement result includes at least one of the following items:

a measurement identifier, a measurement frequency, RSRP, RSRQ, a physical cell identity PCI, a cell global identity CGI, a tracking area code TAC, and a public land mobile network identifier list PLMN Idlist.

Optionally, the first measurement configuration information is included in a system broadcast message SIB5 and/or a radio resource control RRC connection release message.

In this embodiment of the present disclosure, the network side device sends measurement configuration information that is used at least in the inactive mode to the user equipment, so that the user equipment can perform measurement in the inactive mode based on the measurement configuration information. Because the user equipment can perform measurement in the inactive mode, the network side device can quickly configure an SCell of the user equipment and activate the SCell based on the measurement result in the inactive mode that is reported by the user equipment. It can be learned that this embodiment of the present disclosure helps support enhanced rapid carrier activation and deactivation, so that an enhanced rapid carrier activation and deactivation technical solution can be improved.

It should be understood that in this embodiment of this disclosure, the radio frequency unit 701 may be configured to receive and send signals in a process of receiving and sending information or calling. Specifically, the radio frequency unit 701 receives downlink data from a base station for processing by the processor 710, and sends uplink data to the base station. Generally, the radio frequency unit 701 includes but is not limited to an antenna, at least one amplifier, a transceiver, a coupler, a low noise amplifier, and a duplexer. In addition, the radio frequency unit 701 may further communicate with a network and other devices through a wireless communications system.

The user equipment provides wireless broadband Internet access for a user by using a network module 702, for example, helping the user send and receive an email, browse a web page, and access streaming media.

The audio output unit 703 may convert, into an audio signal, audio data received by the radio frequency unit 701 or the network module 702 or stored in the memory 709, and output the audio signal as sound. Moreover, the audio output unit 703 may further provide audio output (for example, call signal receiving sound and message receiving sound) related to a specific function performed by the user equipment 700. The audio output unit 703 includes a loudspeaker, a buzzer, a receiver, and the like.

The input unit 704 is configured to receive an audio signal or a video signal. The input unit 704 may include a graphics processing unit (Graphics Processing Unit, GPU) 7041 and a microphone 7042. The graphics processing unit 7041 processes image data of a static picture or video obtained by an image capture apparatus (such as a camera) in a video capture mode or an image capture mode. A processed image frame may be displayed on the display unit 706. The image frame processed by the graphics processing unit 7041 can be stored in the memory 709 (or another storage medium) or sent via the radio frequency unit 701 or the network module 702. The microphone 7042 may receive sound and can process such sound into audio data. The processed audio data may be converted in a telephone call mode into a format that can be sent by the radio frequency unit 701 to a mobile communications base station for output.

The user equipment 700 further includes at least one sensor 705, such as an optical sensor, a motion sensor, and another sensor. Specifically, the optical sensor includes an ambient light sensor and a proximity sensor. The ambient light sensor may adjust luminance of the display panel 7061 based on brightness of ambient light, and the proximity sensor may disable the display panel 7061 and backlight when the user equipment 700 approaches an ear. As a type of the motion sensor, an accelerometer sensor may detect magnitude of an acceleration in each direction (generally three axes), and may detect magnitude and a direction of gravity when being static. The accelerometer sensor may be used for recognizing user equipment gesture (for example, horizontal and vertical screen switching, a related game, or magnetometer posture calibration), a function related to vibration recognition (for example, a pedometer or a strike), or the like. The sensor 705 may further include a fingerprint sensor, a pressure sensor, an iris sensor, a molecular sensor, a gyroscope, a barometer, a hygrometer, a thermometer, an infrared sensor, and the like. This is not described herein again.

The display unit 706 is configured to display information entered by the user or information provided for the user. The display unit 706 may include a display panel 7061, and the display panel 7061 may be configured in a form of a liquid crystal display (Liquid Crystal Display, LCD), an organic light-emitting diode (Organic Light-Emitting Diode, OLED), or the like.

The user input unit 707 may be configured to receive input digit or character information and generate key signal input related to user setting and function control of user equipment. Specifically, the user input unit 707 includes a touch panel 7071 and another input device 7072. The touch panel 7071, also referred to as a touchscreen, may collect a touch operation performed by the user on or near the touch panel 7071 (for example, an operation performed by the user on or near the touch panel 7071 by using any suitable object or accessory such as a finger or a stylus). The touch panel 7071 may include two parts: a touch detection apparatus and a touch controller. The touch detection apparatus detects a touch position of the user, detects a signal brought by the touch operation, and sends the signal to the touch controller. The touch controller receives touch information from the touch detection apparatus, converts the touch information into touch point coordinates, sends the touch point coordinates to a processor 710, and receives and executes a command sent by the processor 710. In addition, the touch panel 7071 may be implemented by using a plurality of types such as a resistive type, a capacitive type, an infrared ray, and a surface acoustic wave. The user input unit 707 may include another input device 7072 in addition to the touch panel 7071. Specifically, the another input device 7072 may include but is not limited to a physical keyboard, a function key (such as a volume control key or an on/off key), a trackball, a mouse, a joystick, and the like. Details are not described herein again.

Further, the touch panel 7071 may cover the display panel 7061. After detecting the touch operation on or near the touch panel 7071, the touch panel 7071 transmits the touch operation to the processor 710 to determine a type of a touch event, and then the processor 710 provides corresponding visual output on the display panel 7061 based on the type of the touch event. In FIG. 11, the touch panel 7071 and the display panel 7061 are used as two independent components to implement input and output functions of the user equipment. However, in some embodiments, the touch panel 7071 and the display panel 7061 may be integrated to implement the input and output functions of the user equipment. This is not specifically limited herein.

The interface unit 708 is an interface connecting an external apparatus to the user equipment 700. For example, the external apparatus may include a wired or wireless headset port, an external power supply (or battery charger) port, a wired or wireless data port, a storage card port, a port configured to connect to an apparatus having an identification module, an audio input/output (I/O) port, a video I/O port, a headset port, and the like. The interface unit 708 may be configured to receive input (for example, data information and power) from the external apparatus and transmit the received input to one or more elements in the user equipment 700, or may be configured to transmit data between the user equipment 700 and the external apparatus.

The memory 709 may be configured to store a software program and various data. The memory 709 may mainly include a program storage area and a data storage area. The program storage area may store an operating system, an application program required by at least one function (such as a sound play function or an image play function), and the like. The data storage area may store data (such as audio data or an address book) or the like created based on use of the mobile phone. In addition, the memory 709 may include a high-speed random access memory, and may further include a non-volatile memory such as at least one magnetic disk storage component, a flash memory component, or another volatile solid-state storage component.

The processor 710 is a control center of the user equipment, and is connected to all parts of the entire user equipment by using various interfaces and lines, and performs various functions of the user equipment and processes data by running or executing the software program and/or the module that are stored in the memory 709 and invoking the data stored in the memory 709, to implement overall monitoring on the user equipment. The processor 710 may include one or more processing units. Optionally, the processor 710 may be integrated with an application processor and a modem processor. The application processor mainly processes an operating system, a user interface, an application program, and the like, and the modem processor mainly processes wireless communication. It may be understood that the modem processor may not be integrated into the processor 710.

The user equipment 700 may further include a power supply 711 (such as a battery) that supplies power to each component. Optionally, the power supply 711 may be logically connected to the processor 710 by using a power management system, to implement functions such as charging, discharging, and power consumption management by using the power management system.

In addition, the user equipment 700 includes some function modules not shown, and details are not described herein again.

Optionally, an embodiment of the present disclosure further provides user equipment, including a processor 710, a memory 709, and a computer program that is stored in the memory 709 and that can run on the processor 710. When the computer program is executed by the processor 710, each process of the foregoing measurement method embodiments can be implemented, and a same technical effect can be achieved. To avoid repetition, details are not described herein again.

Figure 12:
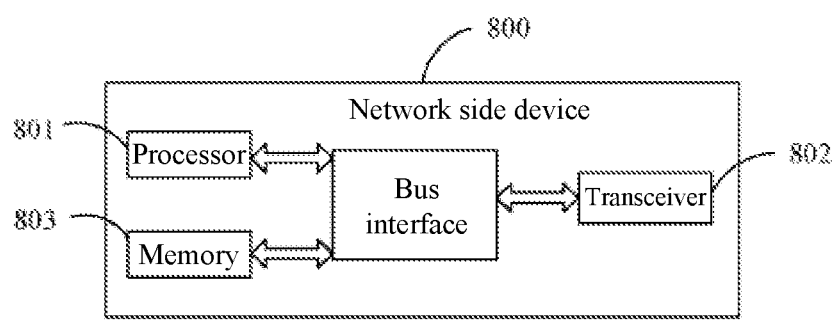
FIG. 12 is a schematic diagram of a hardware structure of another network side device according to an embodiment of the present disclosure.

FIG. 12 is a structural diagram of another network side device according to an embodiment of the present disclosure. As shown in FIG. 12, a network side device 800 includes a processor 801, a transceiver 802, a memory 803, and a bus interface.

The transceiver 802 is configured to:
send first measurement configuration information to user equipment, so that the user equipment performs measurement in an inactive mode based on the first measurement configuration information, to obtain a measurement result; where the first measurement configuration information is used at least in the inactive mode.

The first measurement configuration information is further used in an idle mode, so that the user equipment performs measurement in the idle mode based on the first measurement configuration information.

Optionally, the first measurement configuration information is used in the inactive mode.

The transceiver 802 is further configured to:
send second measurement configuration information to the user equipment, so that the user equipment performs measurement in an idle mode based on the second measurement configuration information; where
the second measurement configuration information is used in the idle mode.

Optionally, the first measurement configuration information includes at least one of the following items:
a measurement bandwidth or bandwidth part, measurement duration, a measurement frequency, a valid measurement area, a target measurement area, a measurement type, and a measurement reporting threshold.

Optionally, the valid measurement area includes at least one of the following items:
a cell identity list, a physical cell identity PCI list, a subset or a full set of a radio access network notification area RNA identity list, and a subset or a full set of a core network tracking area TA identity list; or
the target measurement area includes at least one of the following items:
a cell identity list, a PCI list, a subset or a full set of an RNA identity list, and a subset or a full set of a TA identity list; or
the measurement type includes at least one of the following items:

reference signal receiving power RSRP, reference signal receiving quality RSRQ, and a signal to interference plus noise ratio SINR; or the measurement reporting threshold includes at least one of the following items:

an RSRP threshold, an RSRQ threshold, and an SINR threshold.

Optionally, the measurement result includes at least one of the following items:

a measurement identifier, a measurement frequency, RSRP, RSRQ, a physical cell identity PCI, a cell global identity CGI, a tracking area code TAC, and a public land mobile network identifier list PLMN Idlist.

Optionally, the first measurement configuration information is included in a system broadcast message SIB5 and/or a radio resource control RRC connection release message.

In FIG. 12, a bus architecture may include any quantity of interconnected buses and bridges, which are specifically connected together by one or more processors represented by the processor 801 and various circuits of a memory represented by the memory 803. The bus architecture may further connect together various other circuits of a peripheral device, a voltage stabilizer, a power management circuit, and the like, which are known in this art and will not be further described herein. The bus interface provides an interface. The transceiver 802 may include a plurality of elements, that is, include a transmitter and a receiver, and provide units for communication with various other apparatuses on a transmission medium. For different user equipment, the user interface may further be an interface that can be externally or internally connected to a required device. The connected device includes but is not limited to a keypad, a display, a loudspeaker, a microphone, a joystick, and the like.

The processor 801 is responsible for managing the bus architecture and common processing, and the memory 803 may store data used when the processor 801 performs an operation.

It should be noted that the network side device 800 in this embodiment may be a network side device in any implementation in the method embodiments in the embodiments of the present disclosure. Any implementation of the network side device in the method embodiments in the embodiments of the present disclosure may be implemented by the network side device 800 in this embodiment, and a same beneficial effect is achieved. To avoid repetition, details are not described herein again.

An embodiment of the present disclosure further provides a computer-readable storage medium. A computer program is stored in the computer-readable storage medium. When the computer program is executed by a processor, each process of the foregoing measurement method embodiments corresponding to the foregoing network side device or user equipment, and a same technical effect can be achieved. To avoid repetition, details are not described herein again. The computer-readable storage medium includes a read-only memory (Read-Only Memory, ROM), a random access memory (Random Access Memory, RAM), a magnetic disk, an optical disc, or the like.

It should be noted that in this specification, the term "include", "including", or any other variant is intended to cover non-exclusive inclusion, so that a process, method, article, or apparatus that includes a series of elements includes not only those elements but also other elements that are not explicitly listed, or includes elements inherent to such a process, method, article, or apparatus. In the absence of more restrictions, an element defined by the statement "including a . . . " does not exclude another same element in a process, method, article, or apparatus that includes the element.

According to the foregoing descriptions of the implementations, a person skilled in the art may clearly understand that the foregoing method embodiments may be implemented by using software and a required universal hardware platform, or certainly may be implemented by using hardware. However, in many cases, the former is a better implementation. Based on such an understanding, the technical solutions of the present disclosure essentially or the part contributing to related technologies may be implemented in a form of a software product. The computer software product is stored in a storage medium (such as a ROM/RAM, a magnetic disk, or an optical disc) and includes several instructions for instructing user equipment (which may be a mobile phone, a computer, a server, an air conditioner, or a network device) to execute the methods described in the embodiments of the present disclosure.

The foregoing descriptions are merely specific implementations of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

The invention claimed is:

1. A measurement method performed by user equipment, comprising:
    receiving first measurement configuration information sent by a network side device; and
    performing measurement in an inactive mode based on the first measurement configuration information, to obtain a measurement result,
    wherein the first measurement configuration information is used at least in the inactive mode, and the inactive mode is a radio resource control (RRC) mode different from an idle mode, and
    the method further comprises: if the user equipment switches from the inactive mode to the idle mode and a measurement timer does not expire, performing the following processing on the first measurement configuration information:
        clearing access stratum context information stored in the user equipment, wherein the access stratum context information comprises the first measurement configuration information and the measurement result; or
        clearing the first measurement configuration information and the measurement result; or
        clearing the first measurement configuration information but retaining the measurement result; or
        clearing the measurement result but retaining the first measurement configuration information; or
        retaining the first measurement configuration information and the measurement result.

2. The method according to claim 1, wherein the first measurement configuration information is further used in the idle mode; and
    the method further comprises:
    performing measurement in the idle mode based on the first measurement configuration information.

3. The method according to claim 1, wherein the first measurement configuration information is used in the inactive mode; and the method further comprises:
receiving second measurement configuration information sent by the network side device; and
performing measurement in the idle mode based on the second measurement configuration information; wherein
the second measurement configuration information is used in the idle mode.

4. The method according to claim 1, wherein, if the user equipment moves beyond network coverage, the user equipment switches from the inactive mode to the idle mode; or
if the user equipment initiates a radio resource control (RRC) connection resume request and RRC connection resume fails, the user equipment switches from the inactive mode to the idle mode.

5. The method according to claim 1, wherein the first measurement configuration information comprises at least one of the following items:
a measurement bandwidth or bandwidth part, a measurement duration, a measurement frequency, a valid measurement area, a target measurement area, a measurement type, and a measurement reporting threshold.

6. The method according to claim 5, wherein the valid measurement area comprises at least one of the following items:
a cell identity list, a physical cell identity (PCI) list, a subset or a full set of a radio access network notification area (RAN Notification Area, RNA) identity list, and a subset or a full set of a core network tracking area (TA) identity list; or
the target measurement area comprises at least one of the following items:
a cell identity list, a PCI list, a subset or a full set of an RNA identity list, and a subset or a full set of a TA identity list; or
the measurement type comprises at least one of the following items:
a reference signal receiving power (RSRP), a reference signal receiving quality (RSRQ), and a signal to interference plus noise ratio (SINR); or
the measurement reporting threshold comprises at least one of the following items: an RSRP threshold, an RSRQ threshold, and an SINR threshold.

7. The method according to claim 1, wherein the measurement result comprises at least one of the following items:
a measurement identifier, a measurement frequency, an RSRP, an RSRQ, a PCI, a cell global identity (CGI), a tracking area code (TAC), and a public land mobile network identifier list (PLMN Idlist).

8. The method according to claim 1, wherein the first measurement configuration information is comprised in a system broadcast message system information block type 5 (SIB5) and/or an RRC connection release message.

9. A measurement method performed by a network side device, comprising:
sending first measurement configuration information to user equipment, wherein the first measurement configuration information is used to enable the user equipment to perform measurement in an inactive mode based on the first measurement configuration information, to obtain a measurement result,
wherein the first measurement configuration information is used at least in the inactive mode, and the inactive mode is a radio resource control (RRC) mode different from an idle mode, and
the method further comprises:

if the user equipment switches from the inactive mode to the idle mode and a measurement timer does not expire, performing the following processing on the first measurement configuration information:
clearing access stratum context information stored in the user equipment, wherein the access stratum context information comprises the first measurement configuration information and the measurement result; or
clearing the first measurement configuration information and the measurement result; or
clearing the first measurement configuration information but retaining the measurement result; or
clearing the measurement result but retaining the first measurement configuration information; or
retaining the first measurement configuration information and the measurement result.

10. The method according to claim 9, wherein the first measurement configuration information is further used in the idle mode, and the first measurement configuration information is used to enable the user equipment to perform measurement in the idle mode based on the first measurement configuration information.

11. The method according to claim 9, wherein the first measurement configuration information is used in the inactive mode; and
the method further comprises:
sending second measurement configuration information to the user equipment, wherein the second measurement configuration information is used to enable the user equipment to perform measurement in the idle mode based on the second measurement configuration information,
wherein the second measurement configuration information is used in the idle mode.

12. The method according to claim 9, wherein the first measurement configuration information comprises at least one of the following items:
a measurement bandwidth or bandwidth part, a measurement duration, a measurement frequency, a valid measurement area, a target measurement area, a measurement type, and a measurement reporting threshold.

13. The method according to claim 12, wherein the valid measurement area comprises at least one of the following items:
a cell identity list, a PCI list, a subset or a full set of an RNA identity list, and a subset or a full set of a core network TA identity list; or
the target measurement area comprises at least one of the following items:
a cell identity list, a PCI list, a subset or a full set of an RNA identity list, and a subset or a full set of a TA identity list; or
the measurement type comprises at least one of the following items:
an RSRP, an RSRQ, and an SINR; or
the measurement reporting threshold comprises at least one of the following items:
an RSRP threshold, an RSRQ threshold, and an SINR threshold.

14. The method according to claim 9, wherein the measurement result comprises at least one of the following items:
a measurement identifier, a measurement frequency, an RSRP, an RSRQ, a PCI, a CGI, a TAC, and a PLMN Idlist.

15. The method according to claim 9, wherein the first measurement configuration information is comprised in a system broadcast message SIB5 and/or an RRC connection release message.

16. User equipment, comprising: a memory, a processor, and a computer program that is stored in the memory, wherein the computer program, when executed by the processor, causes the processor to:
receive first measurement configuration information sent by a network side device; and
perform measurement in an inactive mode based on the first measurement configuration information, to obtain a measurement result,
wherein the first measurement configuration information is used at least in the inactive mode, and the inactive mode is a radio resource control (RRC) mode different from an idle mode, and the processor is further caused to:
if the user equipment switches from the inactive mode to the idle mode and a measurement timer does not expire, perform the following processing on the first measurement configuration information:
clearing access stratum context information stored in the user equipment, wherein the access stratum context information comprises the first measurement configuration information and the measurement result; or
clearing the first measurement configuration information and the measurement result; or
clearing the first measurement configuration information but retaining the measurement result; or
clearing the measurement result but retaining the first measurement configuration information; or
retaining the first measurement configuration information and the measurement result.

17. The user equipment of claim 16, wherein the first measurement configuration information is used in the inactive mode; and
the computer program, when executed by the processor, further causes the processor to:
receive second measurement configuration information sent by the network side device; and
perform measurement in the idle mode based on the second measurement configuration information; wherein
the second measurement configuration information is used in the idle mode.

18. The user equipment of claim 16, wherein, if the user equipment moves beyond network coverage, the user equipment switches from the inactive mode to the idle mode; or
if the user equipment initiates an RRC connection resume request and RRC connection resume fails, the user equipment switches from the inactive mode to the idle mode.

* * * * *